(12) United States Patent
Mange

(10) Patent No.: US 11,132,829 B2
(45) Date of Patent: Sep. 28, 2021

(54) METHOD FOR VOXEL RAY-CASTING OF SCENES ON A WHOLE SCREEN

(71) Applicant: ECOLE POLYTECHNIQUE FEDERALE DE LAUSANNE, Lausanne (CH)

(72) Inventor: Robin Mange, Denges (CH)

(73) Assignee: ECOLE POLYTECHNIQUE FÉDÉRALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 16/635,349

(22) PCT Filed: Jul. 31, 2017

(86) PCT No.: PCT/IB2017/054660
§ 371 (c)(1),
(2) Date: Jan. 30, 2020

(87) PCT Pub. No.: WO2019/025829
PCT Pub. Date: Feb. 7, 2019

(65) Prior Publication Data
US 2020/0372697 A1 Nov. 26, 2020

(51) Int. Cl.
*G06T 15/06* (2011.01)
*G06T 1/20* (2006.01)
(Continued)

(52) U.S. Cl.
CPC ............. *G06T 15/06* (2013.01); *G06T 1/20* (2013.01); *G06T 15/005* (2013.01); *G06T 17/10* (2013.01); *G06T 19/006* (2013.01)

(58) Field of Classification Search
CPC .................................................. G06T 15/06
(Continued)

(56) References Cited

U.S. PATENT DOCUMENTS

| 2004/0125103 A1* | 7/2004 | Kaufman | G06T 15/40 345/419 |
| 2006/0290695 A1* | 12/2006 | Salomie | G06T 17/20 345/420 |

FOREIGN PATENT DOCUMENTS

| JP | 2002-183746 | 6/2002 |
| KR | 10-10990660 | 12/2011 |
| WO | 02/50776 | 6/2002 |

OTHER PUBLICATIONS

Jabłoński, Szymon, et al., "Real-time voxel rendering algorithm based on Screen Space Billboard Voxel Buffer with Sparse Lookup Textures," WSCG 2016—24th Conference on Computer Graphics, Visualization and Computer Vision 2016, pp. 27-36.
(Continued)

*Primary Examiner* — Shivang I Patel
(74) *Attorney, Agent, or Firm* — Nixon & Vanderhye P.C.

(57) ABSTRACT

A method for screen-space voxel ray-casting of scenes on a whole screen. The method comprises providing a graphics card; rendering seamlessly any one of the following list of primitives containing at least polygons, voxels; using a GPU pipeline of the graphics card for rasterization; rendering of the primitives sorted from front to back; thereby optimizing a 2D pixel fill rate by in case the primitives are voxels, rendering the voxels as discrete points and storing size and shading information into a per-pixel data structure; storing information about closest primitives into the per-pixel data structure as neighboring 2D pixel data structures; in case the primitives are polygons, rendering the polygons as continuous surfaces and storing shading information into the per-pixel data structure. The method further comprises performing the screen-space voxel ray-casting of scenes on the whole screen by means of the GPU pipeline, thereby selecting intersection candidates from the neighboring 2D pixel data structures; thereby optimizing the screen space ray-
(Continued)

casting of voxels by selecting the intersection candidates using a two-pass convolution screen space kernel of fixed size; and identifying the kernel size per frame, based on the distance to the closest voxel from the camera.

14 Claims, 5 Drawing Sheets

(51) Int. Cl.
    *G06T 15/00*     (2011.01)
    *G06T 17/10*     (2006.01)
    *G06T 19/00*     (2011.01)
(58) Field of Classification Search
    USPC .......................................................... 345/419
    See application file for complete search history.

(56) References Cited

OTHER PUBLICATIONS

Laine, Samuli, et al., "Efficient Sparse Voxel Octrees," ACM SIGGRAPH Symposium on Interactive 3D Graphics and Games (I3D), Feb. 2010, 9 pages.
International Search Report for PCT/IB2017/054660, dated Mar. 29, 2018, 5 pages.
Written Opinion of the ISA for PCT/IB2017/054660, dated Mar. 29, 2018, 6 pages.
Ray et al., "Ray Casting Architectures For Volume Visualization", IEEE Transactions on Visualization and Computer Graphics, vol. 5, nol. 3, Jul. 1, 1999, pp. 210-223.

\* cited by examiner

METHOD FOR VOXEL RAY-CASTING OF SCENES ON A WHOLE SCREEN

This application is the U.S. national phase of International Application No. PCT/IB2017/054660 filed 31 Jul. 2017, which designated the U.S., the entire contents of each of which are hereby incorporated by reference.

FIELD OF THE INVENTION

The invention is in the field of voxel rendering of graphical scenes on a whole screen.

BACKGROUND

It is known to implement a rendering pipeline based on sparse voxel octrees rendering, as explained in a Research paper from NVIDIA, Samuli Laine, Tero Karras, *Efficient Sparse Voxel Octrees*, in ACM SIGGRAPH Symposium on Interactive 3D Graphics and Games (I3D), February 2010, or alternatively along the lines of a different approach for the rendering, inspired from the publication to Szymon Jablonski, Tomasz Martyn, *Real-time voxel rendering algorithm based on Screen Space Billboard Voxel Busser with Sparce Lookup Textures*, WSCG 2016—24th WSCG Conference on Computer Graphics, Visualization and Computer Vision 2016.

Preliminary tests with the above described implementations showed that those approaches—i.e., targeting volumetric rendering using voxels—fall to poor performance for desired virtual reality experiences that require to be rendered at very high resolution and at high framerates, i.e., approximately 2160×1200 pixels at 90 Hz for current commercial devices. An other disadvantage is the lack of an optimized stereoscopic rendering implementation that is a key element for virtual reality, augmented reality and mixed reality. Additionally those implementations cannot handle rendering primitives different from voxels.

SUMMARY OF INVENTION

In a first aspect, the invention provides a method for screen-space voxel ray-casting of scenes on a whole screen. The method comprises providing a graphics card; rendering seamlessly any one of the following list of primitives containing at least polygons, voxels; using a GPU pipeline of the graphics card for rasterization; rendering of the primitives sorted from front to back; thereby optimizing a 2D pixel fill rate by in case the primitives are voxels, rendering the voxels as discrete points and storing size and shading information into a per-pixel data structure; storing information about closest primitives into the per-pixel data structure as neighboring 2D pixel data structures; in case the primitives are polygons, rendering the polygons as continuous surfaces and storing shading information into the per-pixel data structure. The method further comprises performing the screen-space voxel ray-casting of scenes on the whole screen by means of the GPU pipeline, thereby selecting intersection candidates from the neighboring 2D pixel data structures; thereby optimizing the screen space ray-casting of voxels by selecting the intersection candidates using a two-pass convolution screen space kernel of fixed size; and identifying the kernel size per frame, based on the distance to the closest voxel from the camera.

In a preferred embodiment, the candidate selection screen space kernel of fixed size is decoupled into a pair of convoluted screen space kernels of fixed size; and the step of selecting rendering candidates comprises a horizontal pass and a vertical pass.

In a further preferred embodiment, the method further comprises real-time modeling and alterations as well as dynamic mathematical simulations of scene geometry; thereby enabling complex real-time visual effects generation.

In a further preferred embodiment, the method further comprises combining the screen-space voxel ray-casting algorithm with particle based simulation that follows real world physics.

In a further preferred embodiment, the method further comprises optimizing the integration of different real-time streams including those from acquisition devices and data structures such as point clouds into a voxel representation for a seamless rendering of complex scenes on the whole screen; thereby enabling the perfect flow for mixed reality setting.

In a further preferred embodiment, the method further comprises using instances to perform fast stereoscopic rendering with the help of the GPU geometry shader pipeline in the case of a VR setting.

In a second aspect, the invention provides a data carrier, comprising software code, which when the code is read and executed by a computer having access to the data carrier, causes the computer to implement the method as described herein above.

In a third aspect, the invention provides a device configured to implement screen-space voxel ray-casting of scenes on a whole screen, comprising at least the following features enabled to execute the method as described herein above: a DRAM memory module; a cache memory unit; a vertex Fetch unit configured to gather the primitives from the DRAM memory module; a vertex shader configured to transform the primitives based on camera and projection matrices; a geometry shader configured such that within the geometry shader each primitive is duplicated to perform stereoscopic rendering in the case of a VR setting; a rasterizer enabled to project the primitives on the whole screen); a Pixel Shader configured to receive the output from the rasterize, and perform a depth testing and filling of the data structure containing voxel information; and a rendering of primitives unit configured to perform the screen space ray-casting phase. The vertex fetch unit, the vertex shader, the geometry shader, the rasteriser and the pixel shader are operationally connected to the cache memory unit, and the pixel shader and the rendering of primitives unit are operationally connected to the DRAM memory unit.

BRIEF DESCRIPTION OF THE FIGURES

The invention will be better understood through the description of preferred embodiments, and in reference to figures, wherein.

DETAILED DESCRIPTION OF PREFERRED EMBODIMENTS

A voxel is a volume entity that represents a discrete value of a geometric surface in a three-dimensional space. As with pixels in a bitmap, voxels themselves do not typically have their position (their coordinates) explicitly encoded along with their values. Instead, rendering systems infer the position of a voxel based upon its position relative to other voxels (i.e., its position in the data structure that makes up a single volumetric image). In contrast to pixels and voxels, points and polygons are often explicitly represented by the coordinates of their vertices. A direct consequence of this difference is that polygons can efficiently represent simple 3D structures with lots of empty or homogeneously filled space, while voxels excel at representing regularly sampled spaces that are non-homogeneously filled.

Voxels are frequently used in the visualization and analysis of medical and scientific data. Some volumetric displays use voxels to describe their resolution. For example, a display might be able to show 512×512×512 voxels.

The word voxel originated by analogy with the word "pixel", with vo representing "volume" and el representing "element".

A technique for performing rendering of voxel environments through screen space ray-casting is disclosed. Various embodiments of this algorithm may be implemented in hardware, software or combinations thereof.

Figure 1:
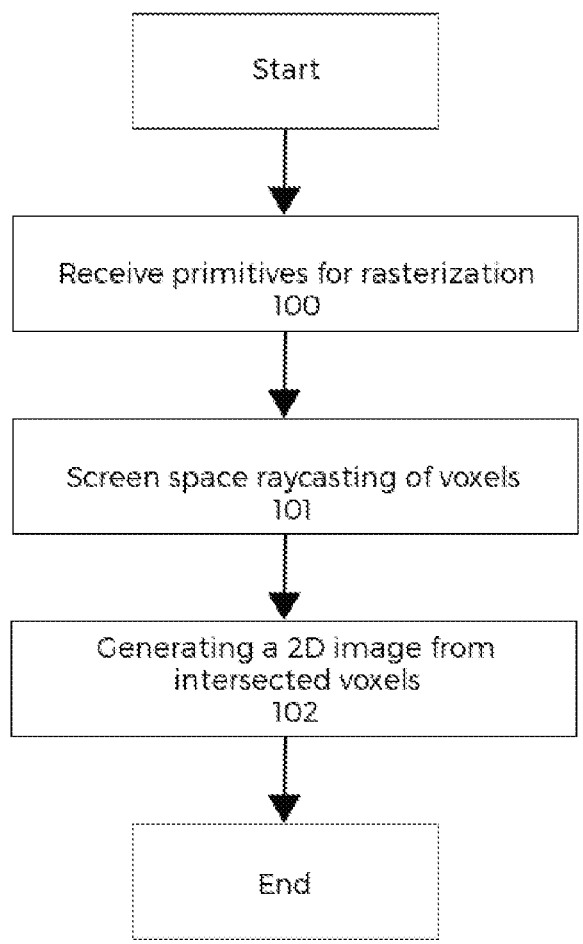
FIG. 1 illustrates a flowchart of the rendering method according to the invention.

FIG. 1 illustrates a flowchart of a method to render voxel environments. At step 100, a processing engine receives a set of primitives (triangles or voxels) for rendering. At step 101, the processing engine performs a screen space ray-casting algorithm that first selects a set of potential intersecting candidates for each pixel of the final image to be rendered by checking neighboring pixels voxel data structures; then it performs 3D intersection testing and finally finds the closest voxel intersected by the ray going through a processed 2D pixel. At step 102, the 2D pixels get colored from the data of their individual selected voxels.

Figure 2:
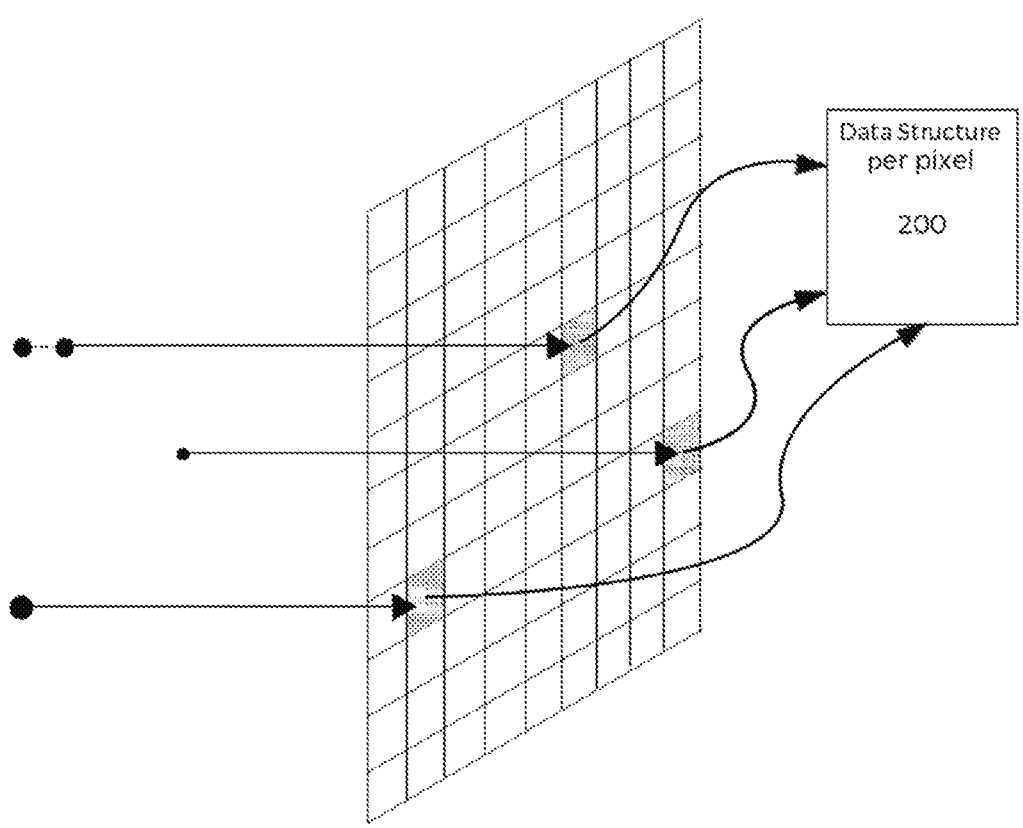
FIG. 2 illustrates the rasterization process of points into a voxel buffer according to the invention.

FIG. 2 illustrates the rasterization step, which takes a set of primitives and projects them onto the screen, allowing to extrapolate per 2D pixel information about the closest primitive. Triangles are rendered in a continuous way over the screen (not shown in FIG. 2), while each of the voxels is rendered as discrete point (see the round spots to the left of FIG. 2) and is therefore covering at most one 2D pixel, illustrated as textured square in FIG. 2. A custom buffer 200 is used to store efficiently the data corresponding to each pixel required for the subsequent steps.

Figure 3:
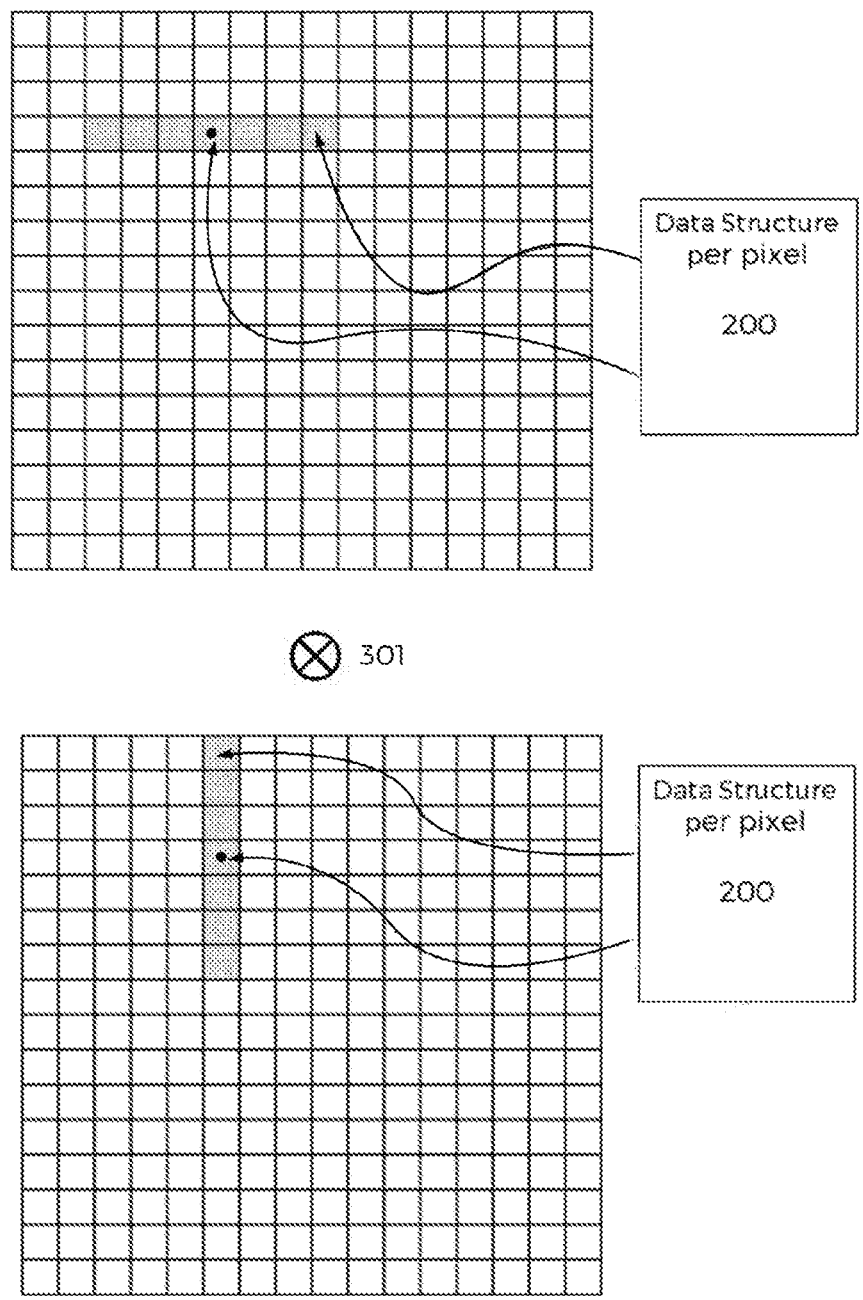
FIG. 3 illustrates the convoluted steps that optimize the screen space ray-casting of voxels according to the invention.

FIG. 3 illustrates the process of performing screen-space ray-casting per 2D pixel of the target final image. The custom buffer 200 filled in the previous stage is used as it contains necessary information to perform the ray-casting intersection tests with the voxels. The process is performed by selecting intersection candidates by gathering them from neighboring 2D pixels buffer. A further optimization is to perform it in a two steps convolution which will lead faster to the same result: first we select a kernel fixed size, for example based on smallest 3D distance between a voxel and the screen; then we use that kernel in a first horizontal pass, only selecting intersection candidates in the same row, as illustrated in the upper part of FIG. 3 by the row of grey squares; and finally, in a process of convolution 301, we perform a vertical pass using the intermediate result of previous the first one, as illustrated in the lower part of FIG. 3 by the column of grey squares; we then obtain the finalized list of intersected voxel per 2D pixel.

Figure 4:
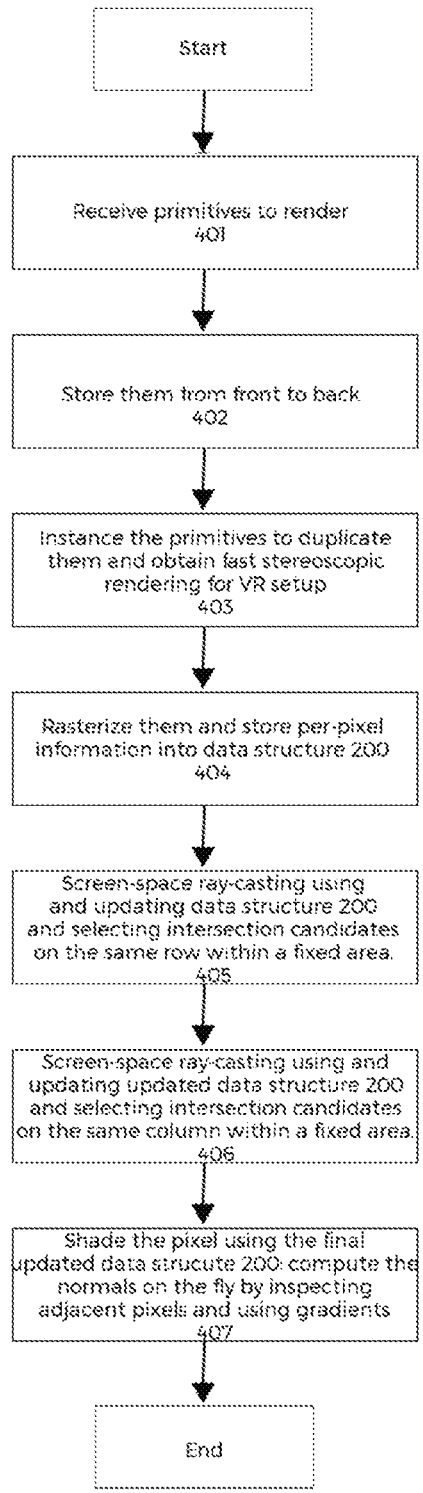
FIG. 4 illustrates a detailed flow chart of the complete algorithm disclosed.

FIG. 4 illustrates a detailed flow chart of the disclosed method; the flowchart comprises steps 401-407. After starting the execution of the method, in box 401 primitives to render are received, and stored from back to end in the step of box 402. Box 403 illustrates that the primitives are instanced to be duplicated and to obtain fast stereoscopic rendering for VR setup. The data structure 200 gets initialized in step 404 and updated through steps 405—screen-space ray-casting using and updating data structure 200 and selecting intersection candidates on the same column within a fixed area—and 406—screen-space ray-casting using and updating updated data structure 200 and selecting intersection candidates on the same column within a fixed area to be used for the final image composition in 407—shade the pixel using the final updated data structure 200, compute the normals on the fly by inspecting adjacent pixels and using gradients.

Figure 5:
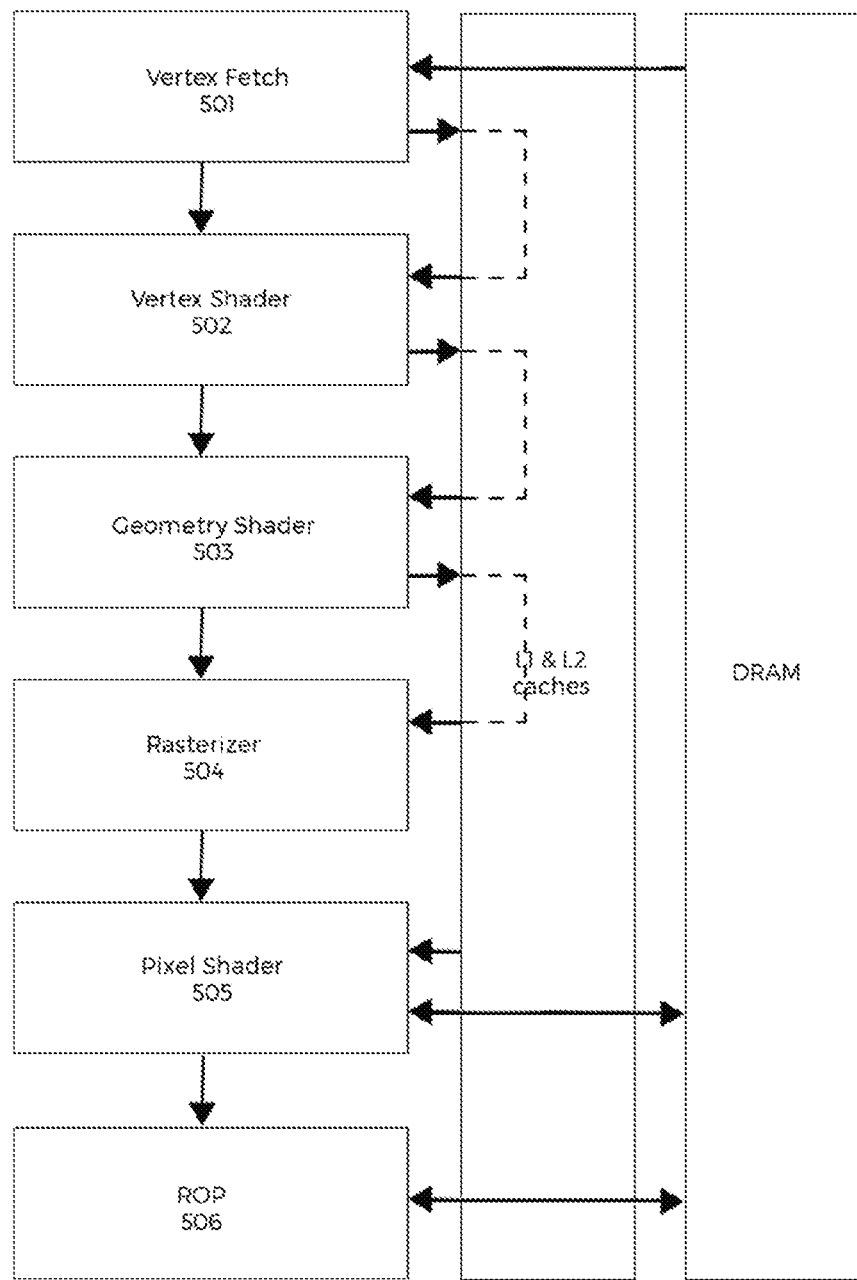
FIG. 5 illustrates a typical hardware architecture according to one embodiment of the invention.

FIG. 5 illustrates a hardware architecture from one embodiment according to the invention. The stages described in FIG. 2 and FIG. 3 are implemented on that hardware architecture. A vertex Fetch unit 501 gathers the primitives (not shown in FIG. 5) from a DRAM module, as illustrated by the arrow coming from the DRAM and pointing to box 501. The primitives are then transformed in the vertex shader 502 based on camera and projection matrices (not illustrated in FIG. 5). Subsequently, within a geometry shader 503, each primitive is duplicated to perform stereoscopic rendering in the case of a VR setting (details not illustrated in FIG. 5). In a rasterizer 504, the primitives are projected on the image screen (not illustrated in FIG. 5) and sent to a Pixel Shader 505 that performs the depth testing and fill the data structure containing voxel information (as shown FIG. 2), and performs the screen space ray-casting phase in box 506 representing a Rendering of Primitives.

The illustrated hardware further illustrates L1 & L2 caches, which allow to store and retrieve data to and from various components 501-505 as illustrated by arrows departing of arriving from the L1 & L2 caches representations. Also the Pixel shader 505 and the ROP 506 are shown to store and read data from the DRAM.

The preferred embodiments discussed herein are example embodiments. The invention is limited only by the scope of the appended claims.

The invention claimed is:

1. A method for screen-space voxel ray-casting of scenes on a screen by a computer device having a graphics processing unit (GPU), the method comprising the steps of:
    seamlessly rendering primitives, the primitives including at least one of polygons or voxels;
    rasterizing the primitives by a GPU pipeline of the GPU;
    rendering the primitives sorted from front to back to optimize a 2D pixel fill rate by,
        rendering the voxels as discrete points and storing size and shading information into a per-pixel data structure and storing information about closest primitives into the per-pixel data structure as neighboring 2D pixel data structures in a case where the primitives include voxels,
        rendering the polygons as continuous surfaces and storing shading information into the per-pixel data structure in case where the primitives are polygons,
    performing the screen-space voxel ray-casting of scenes on the screen by the GPU pipeline to select intersection candidates from the neighboring 2D pixel data structures to optimize a screen space ray-casting of voxels by,
  selecting the intersection candidates using a two-pass convolution screen space kernel of fixed size; and
  identifying the kernel size per frame based on a distance to the closest voxel from a camera.

2. The method of claim 1, wherein
the candidate selection screen space kernel of fixed size is decoupled into a pair of convoluted screen space kernels of fixed size; and
the step of selecting rendering candidates comprises a horizontal pass and a vertical pass.

3. The method of claim 1, further comprising the step of:
real-time modeling, altering, and dynamic mathematical simulating of scene geometry for complex real-time visual effects generation.

4. The method of claim 1, further comprising the step of:
combining the step of performing screen-space voxel ray-casting with a step of particle based simulating based on real world physics.

5. The method of claim 1, further comprising the step of:
optimizing an integration of different real-time streams including real-time streams from acquisition devices and data structures into a voxel representation for a seamless rendering of complex scenes on the screen to enable a flow for mixed reality setting.

6. The method of claim 1, further comprising the step of:
using instances to perform fast stereoscopic rendering by a geometry shader pipeline of the GPU in a case of a VR setting.

7. A non-transitory computer-readable medium having computer software code recorded thereon, the computer software code configured to perform a method when executed by a computer device having a graphics processing unit (GPU), the method comprising the steps of:
  seamlessly rendering primitives, the primitives including at least one of polygons or voxels;
  rasterizing the primitives by a GPU pipeline of the GPU;
  rendering the primitives sorted from front to back to optimize a 2D pixel fill rate by,
    rendering the voxels as discrete points and storing size and shading information into a per-pixel data structure and storing information about closest primitives into the per-pixel data structure as neighboring 2D pixel data structures in a case where the primitives include voxels,
    rendering the polygons as continuous surfaces and storing shading information into the per-pixel data structure in case where the primitives are polygons,
  performing the screen-space voxel ray-casting of scenes on the screen by the GPU pipeline to select intersection candidates from the neighboring 2D pixel data structures to optimize a screen space ray-casting of voxels by,
    selecting the intersection candidates using a two-pass convolution screen space kernel of fixed size; and
    identifying the kernel size per frame based on a distance to the closest voxel from a camera.

8. The non-transitory computer readable medium of claim 7, wherein
the candidate selection screen space kernel of fixed size is decoupled into a pair of convoluted screen space kernels of fixed size; and
the step of selecting rendering candidates comprises a horizontal pass and a vertical pass.

9. The non-transitory computer readable medium of claim 7, further comprising the step of:
real-time modeling, altering, and dynamic mathematical simulating of scene geometry for complex real-time visual effects generation.

10. The non-transitory computer readable medium of claim 7, further comprising the step of:
combining the step of performing screen-space voxel ray-casting with a step of particle based simulating based on real world physics.

11. The non-transitory computer readable medium of claim 7, further comprising the step of:
optimizing an integration of different real-time streams including real-time streams from acquisition devices and data structures into a voxel representation for a seamless rendering of complex scenes on the screen to enable a flow for mixed reality setting.

12. The non-transitory computer readable medium of claim 7, further comprising the step of:
using instances to perform fast stereoscopic rendering by a geometry shader pipeline of the GPU in a case of a VR setting.

13. A device for screen-space voxel ray-casting of scenes on a screen comprising:
  a DRAM memory module;
  a cache memory unit;
  a vertex fetch unit configured to gather primitives from the DRAM memory module, the primitives including at least one of polygons or voxels;
  a vertex shader configured to transform the primitives based on camera and projection matrices;
  a geometry shader configured to duplicate each primitive to perform stereoscopic rendering in a case of a VR setting within the geometry shader;
  a rasterizer configured to project the primitives on the screen;
  a pixel shader configured to receive an output from the rasterizer and perform a depth testing and filling of the data structure including voxel information; and
  a primitives rendering unit configured to perform a screen space ray-casting phase,
  wherein the vertex fetch unit, the vertex shader, the geometry shader, the rasterizer, and the pixel shader are operationally connected to the cache memory unit, and the pixel shader and the primitives rendering unit are operationally connected to the DRAM memory unit.

14. The device of claim 13, wherein the primitives rendering unit is configured to render the primitives sorted from front to back to optimize a 2D pixel fill rate by, rendering the voxels as discrete points and storing size and shading information into a per-pixel data structure and storing information about closest primitives into the per-pixel data structure as neighboring 2D pixel data structures in a case where the primitives include voxels, and by rendering the polygons as continuous surfaces and storing shading information into the per-pixel data structure in case where the primitives are polygons.

* * * * *